(12) United States Patent
Yang et al.

(10) Patent No.: US 8,600,054 B2
(45) Date of Patent: Dec. 3, 2013

(54) METHOD, APPARATUS, AND SYSTEM FOR PREVENTING ABUSE OF AUTHENTICATION VECTOR

(75) Inventors: Yanmei Yang, Shenzhen (CN); Yixian Xu, Shenzhen (CN); Jing Chen, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 94 days.

(21) Appl. No.: 12/892,757

(22) Filed: Sep. 28, 2010

(65) Prior Publication Data

US 2011/0023094 A1     Jan. 27, 2011

Related U.S. Application Data

(63) Continuation of application No. PCT/CN2009/070923, filed on Mar. 20, 2009.

(30) Foreign Application Priority Data

Mar. 31, 2008    (CN) .......................... 2008 1 0066439

(51) Int. Cl.
     *H04L 9/32*      (2006.01)

(52) U.S. Cl.
     USPC ............... 380/248; 726/4; 455/411; 713/169; 380/270

(58) Field of Classification Search
     USPC ........ 379/199; 380/255; 455/410, 411, 435.1; 713/153, 168, 169, 171
     See application file for complete search history.

(56) References Cited

U.S. PATENT DOCUMENTS

| | | | |
|---|---|---|---|
| 5,956,498 A | 9/1999 | Mangelsdorf | |
| 7,716,723 B1* | 5/2010 | Taylor et al. | 726/7 |
| 2003/0159067 A1* | 8/2003 | Stirbu | 713/201 |
| 2005/0197100 A1* | 9/2005 | Evenou et al. | 455/410 |
| 2006/0019635 A1* | 1/2006 | Ollila et al. | 455/411 |
| 2006/0077926 A1* | 4/2006 | Rune | 370/328 |
| 2006/0245406 A1* | 11/2006 | Shim | 370/338 |
| 2007/0130471 A1 | 6/2007 | Walker Pina et al. | |
| 2008/0026724 A1* | 1/2008 | Zhang | 455/411 |

(Continued)

FOREIGN PATENT DOCUMENTS

| CN | 1490984 A | 4/2004 |
|---|---|---|
| CN | 1770686 A | 5/2006 |

(Continued)

OTHER PUBLICATIONS

International Search Report dated May 28, 2009 in connection with International Patent Application No. PCT/CN2009/070923.

(Continued)

*Primary Examiner* — Oscar Louie
*Assistant Examiner* — Zhimei Zhu

(57) ABSTRACT

A method for preventing abuse of an Authentication Vector (AV) and a system and apparatus for implementing the method are provided. Access network information of a non-3rd Generation Partnership Project (3GPP) access network where a user resides is bound to an AV of the user, so that when the user accesses an Evolved Packet System (EPS) through the non-3GPP access network, even if an entity in the non-3GPP access network is breached, or an Evolved Packet Data Gateway (ePDG) connected to an untrusted non-3GPP access network is breached, the stolen AV cannot be applied to other non-3GPP access networks by an attacker.

8 Claims, 2 Drawing Sheets

(56) References Cited

U.S. PATENT DOCUMENTS

| | | | |
|---|---|---|---|
| 2008/0057906 A1* | 3/2008 | Lee et al. | 455/411 |
| 2008/0092212 A1* | 4/2008 | Patel et al. | 726/3 |
| 2008/0305792 A1* | 12/2008 | Khetawat et al. | 455/435.1 |
| 2009/0049526 A1* | 2/2009 | Zhang et al. | 726/4 |
| 2010/0009660 A1 | 1/2010 | Ishikawa | |
| 2011/0004754 A1* | 1/2011 | Walker et al. | 713/168 |

FOREIGN PATENT DOCUMENTS

| | | |
|---|---|---|
| CN | 1822540 A | 8/2006 |
| CN | 1849837 A | 10/2006 |
| CN | 101102600 A | 1/2008 |
| CN | 101106452 A | 1/2008 |
| EP | 1 798 910 A1 | 6/2007 |
| WO | WO 2004/036854 A1 | 4/2004 |

OTHER PUBLICATIONS

3 GPP TS33.402 V8.0.0, "3rd Generation Partnership Project; Technical Specification Group Services and System Aspects; 3 GPP System Architecture Evolution (SAE); Security aspects of non-3 GPP accesses (Release 8)", Jun. 2008, p. 12.

3 GPP TS 33.402 V8.0.0, "3rd Generation Partnership Project; Technical Specification Group Services and System Aspects; 3GPP System Architecture Evolution (SAE); Security aspects of non-3GPP accesses (Release 8)", Jun. 2008, 141 pages.

Translation of Office Action dated Apr. 26, 2010 in connection with Chinese Office Action No. 200810066439.9.

3 GPP TS 33.234 V9.2.0, "3rd Generation Partnership Project; Technical Specification Group Service and System Aspects; 3G Security; Wireless Local Area Network (WLAN) interworking security (Release 9)", Jun. 2010, 102 pages.

3 GPP TS 33.402 V9.4.0, "3rd Generation Partnership Project; Technical Specification Group Services and System Aspects; 3 GPP System Architecture Evolution (SAE); Security aspects of non-3 GPP accesses (Release 9)", Jun. 2010, 47 pages.

3 GPP TS 23.402 V10.0.0, "3rd Generation Partnership Project; Technical Specification Group Services and System Aspects; Architecture enhancements for non-3GPP accesses (Release 10)", Jun. 2010, 208 pages.

Written Opinion of the International Searching Authority dated May 28, 2009 in connection with International Patent Application No. PCT/CN2009/070923.

"3rd Generation Partnership Project; Technical Specification Group Services and System Aspects; General Packet Radio Service (GPRS); Service description; Stage 2 (Release 8)", 3GPP TS 23.060 v8.0.0, Mar. 2003, 218 pages.

"3rd Generation Partnership Project; Technical Specification Group Services and System Aspects; IP Multimedia Subsystem (IMS); Stage 2 (Release 8)", 3GPP TS 23.228 v8.0.0, Mar. 2007, 224 pages.

Partial translation of Office Action dated Jun. 28, 2013 in connection with Chinese Patent Application No. 201110322304.6.

Li Jing, et al., "Amendment of the Authentication and Key Agreement for IMS", IMS Technology and Application, Dec. 6, 2007, 9 pages.

Search Report dated Jun. 21, 2013 in connection with Chinese Patent Application No. 2011103223046.

* cited by examiner

METHOD, APPARATUS, AND SYSTEM FOR PREVENTING ABUSE OF AUTHENTICATION VECTOR

CROSS-REFERENCE TO RELATED APPLICATIONS

This application is a continuation of International Application No. PCT/CN2009/070923, filed on Mar. 20, 2009, which claims priority to Chinese Patent Application No. 200810066439.9, filed on Mar. 31, 2008, both of which are hereby incorporated by reference in their entireties.

TECHNICAL FIELD

The present invention relates to the field of mobile communications technology, and more particularly to a method, an apparatus, and a system for preventing abuse of an Authentication on Vector (AV).

BACKGROUND

Currently, in the research of the Evolved Packet System (EPS) in the 3rd Generation Partnership Project (3GPP), the requirement that non-3GPP access network accesses the EPS is proposed. Non-3GPP access system mainly includes two types of non-3GPP access network, namely, trusted non-3GPP access networks and untrusted non-3GPP access networks. The trusted non-3GPP access networks include the Worldwide Interoperability for Microwave Access (Wimax) network and Code Division Multiple Access (CDMA) 2000 network, etc. The untrusted non-3GPP access networks include the Wireless Local Area Network (WLAN), etc.

When non-3GPP access network accesses the EPS, trusted non-3GPP access network and untrusted non-3GPP access network use different interfaces to connect to Authorization, Authentication and Accounting Server (AAA server) of the EPS. The AAA server is connected to a Home Subscriber Server (HSS) only through one same interface, that is, when the non-3GPP access network accesses the EPS, the AAA server is required to acquire an AV from the HSS through the same interface. In this way, when User Equipment (UE) accesses the EPS through the non-3GPP access network, if an entity in the non-3GPP access network is breached, or an Evolved Packet Data Gateway (ePDG) connected to the untrusted non-3GPP access network is breached, the AV delivered by the AAA server may be stolen by an attacker, so that the attacker applies the AV to other non-3GPP access networks for further attack.

SUMMARY

The present invention is directed to a method for preventing abuse of an AV, so that when a user accesses an EPS through a non-3GPP access network, even if an entity in the non-3GPP access network is breached, or an ePDG connected to an untrusted non-3GPP access network is breached, the stolen AV cannot be applied to other non-3GPP access networks by an attacker.

In an embodiment, the present invention provides a method for preventing abuse of an AV. The method includes the following steps:

receiving access network information of a non-3GPP access network where a user resides, wherein the access network information is sent by an AAA server;

generating binding information corresponding to an AV of the user and the access network information; and sending the binding information to the AAA server.

The present invention is further directed to an apparatus and a system for implementing the preceding method.

In an embodiment, the present invention provides an HSS. The HSS includes a receiving unit, a processing unit, and a sending unit.

The receiving unit is configured to receive access network information of a non-3GPP access network where a user resides, wherein the access network information is sent by an AAA server, and provide the access network information to the processing unit.

The processing unit is configured to generate binding information corresponding to an AV of the user and the access network information, and provide the binding information to the sending unit.

The sending unit is configured to send the AAA server the binding information provided by the processing unit.

In an embodiment, the present invention provides an AAA server. The AAA server includes a sending unit and a receiving unit.

The sending unit is configured to send access network information of a non-3GPP network where a user resides to an HSS.

The receiving unit is configured to receive binding information corresponding to an AV of the user and the access network information, wherein the binding information is sent by the HSS.

In an embodiment, the present invention provides a system for preventing abuse of an AV. The system includes an AAA server and an HSS.

The AAA server is configured to send access network information of a non-3GPP network where a user resides to the HSS, and receive binding information corresponding to an AV of the user and the access network information, wherein the binding information is sent by the HSS.

The HSS is configured to receive the access network information of the non-3GPP network where the user resides, wherein the access network information is sent by the AAA server, generate the binding information corresponding to the AV of the user and the access network information, and send the binding information to the AAA server.

Compared with the prior art, the embodiments of the present invention have the following advantages: Access network information of a non-3GPP network where a user resides is bound to an AV of the user, so that the stolen AV cannot be applied to other non-3GPP access networks by an attacker when the user accesses an EPS through the non-3GPP access network, even if an entity in the non-3GPP access network is breached, or an ePDG connected to an untrusted non-3GPP access network is breached.

DETAILED DESCRIPTION

Figure 1:
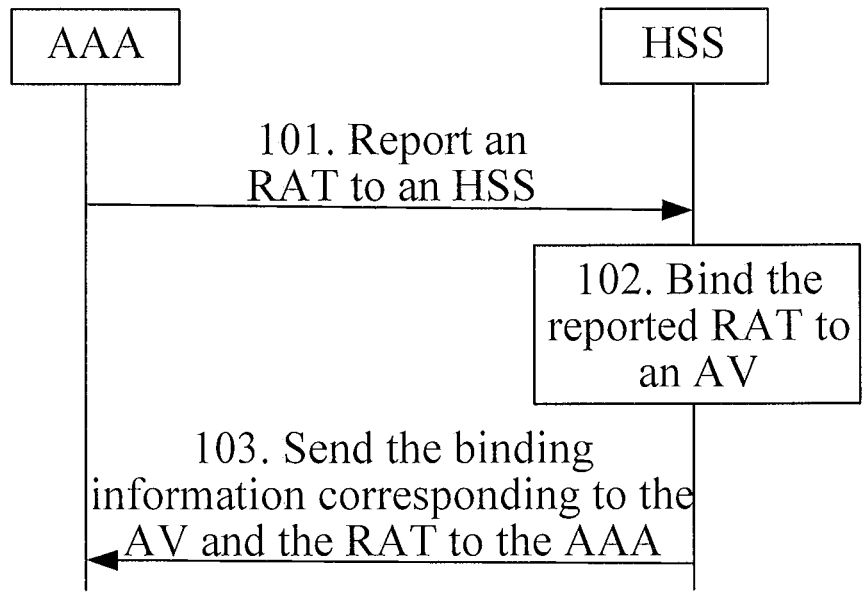
FIG. 1 is a flow chart illustrating a process of binding access network information to an AV in Embodiment 1 of the present invention.

A method for preventing abuse of an AV is provided in Embodiment 1 of the present invention. It is assumed that a user accesses an EPS through a Wimax network. As shown in FIG. 1, the method includes the following steps:

In step 101, when accessing the EPS through the Wimax network, the user is connected to an AAA server through an interface between a trusted non-3GPP access network and the AAA server. The AAA server reports Radio Access Technology (RAT) of the non-3GPP access network to the HSS. In this embodiment, the RAT indicates that the accessed non-3GPP access network is a Wimax network.

In this embodiment, letters, numbers, or other forms can be used by AAA to represent different RATs. The form is not limited, as long as the form can represent the RAT of the non-3GPP access network.

In this embodiment, the AAA can carry the RAT in a certain Diameter Attribute Value Pair (AVP). For example, the AAA server may carry the reported RAT in a Diameter AVP: [visited-network-identifier] and send it to the HSS, or carry the RAT in a Diameter AVP: [NAS-Port-Type], in which numbers defined therein are used to represent the RAT or redefine the bits to represent the RAT. The Diameter AVP carrying the RAT is not limited to the above two examples, and any Diameter AVP that can achieve the purpose of RAT reporting can be used to carry the RAT.

In step 102, after receiving an authentication request from the AAA server, the HSS binds the RAT reported by the AAA server to an AV of the user, and generates the binding information of AV and the RAT.

AV is generated according to the prior art, and the inventive concept of this embodiment does not involve the generation of the AV.

In this embodiment, the RAT reported by the AAA server can be bound to the AV by calculating a key, and the generated binding information is the calculated key. For example, the HSS calculates a key according to the formula: Key=K(CK, IK, Wimax), where CK and IK are two parameters in the AV; Wimax is the RAT reported by the AAA server, and may be represented by letters or numbers or in other forms; and K( ) is an algorithm for calculating the key. The algorithm may be any related algorithm well known in the art, such as HMAC-SHA-256 as defined in IETF RFC 2104: "HMAC: Keyed-Hashing for Message Authentication". The HSS can bind the RAT to the AV by using this method, and the calculated Key is the generated binding information.

In this embodiment, the HSS can also carry the RAT in [SIP-Authentication-Scheme] or [Authentication Method] in a Diameter AVP: [SIP-Auth-Data-Item], and bind the RAT to the AV. The Diameter AVP generated in this way is the binding information. Definitely, the Diameter AVP carrying the RAT is not limited to that described above, and any Diameter AVP that can implement the binding corresponding to the RAT and the AV can be applied.

In step 103, the HSS sends the binding information of the AV and the RAT to the AAA server. If the RAT is bound to the AV by calculating a key, the key is sent to the AAA server; if the RAT is bound to the AV by carrying the RAT in a certain Diameter AVP, the Diameter AVP is sent to the AAA server.

The RAT of the non-3GPP access network where the user resides can be bound to the AV by using the above method. After the binding, the stolen AV cannot be applied to other non-3GPP networks by the attacker even if an entity in the non-3GPP access network where the user resides is breached, or an ePDG connected to an untrusted non-3GPP access network is breached.

The non-3GPP access network in the above embodiment takes the Wimax network for an example. In practice, this solution can also be applied to a CDMA2000 network.

In addition, the non-3GPP access network where the user resides can also be a WLAN network. Although no published standard documents related to the WLAN network contain relevant content about the binding of an RAT to an AV, to enhance the system security, binding of an RAT to an AV may also be required when the WLAN accesses the EPS in the future development of the WLAN. Embodiment 2 of the present invention is provided as follows to illustrate how to bind an RAT to an AV when a user accesses an EPS through a WLAN network. The method includes the following steps.

In a first step, after accessing the EPS through the WLAN network, the user is connected to an AAA server through an interface between an untrusted non-3GPP access network and the AAA server. The AAA server reports the RAT of the non-3GPP access network accessed by the user to an HSS. In this embodiment, the RAT indicates that the accessed non-3GPP access network is a WLAN network.

In this embodiment, the AAA can use letters or numbers or other forms to represent different RATs. The form is not limited as long as the form can represent the RAT of the non-3GPP access network accessed by the user.

In this embodiment, the AAA can carry the RAT in a certain Diameter AVP. The specific method is as described in the example in Embodiment 1.

In a second step, after receiving an authentication request of the AAA server, the HSS binds the RAT reported by the AAA server to an AV of the user, and generates binding information corresponding to the AV and the RAT.

In this embodiment, the RAT reported by the AAA server can be bound to the AV by calculating a key, and the generated binding information is the calculated key. For example, the HSS calculates a key according to the formula: Key=K (CK, IK, WLAN), in which the meanings of the parameters are as described in Embodiment 1. The HSS can bind the RAT to the AV by using this method, and the calculated Key is the generated binding information.

In this embodiment, the HSS can also carry the RAT in [SIP-Authentication-Scheme] or [Authentication Method] in a Diameter AVP: [SIP-Auth-Data-Item] and bind the RAT to the AV. The Diameter AVP generated in this way is the binding information. Definitely, the Diameter AVP carrying the RAT is not limited to that described above, and any Diameter AVP that can implement the binding between the RAT and the AV can be applied.

In a third step, the HSS sends the binding information corresponding to the AV and the RAT to the AAA server. If the RAT is bound to the AV by calculating a key, the key is sent to the AAA server; if the RAT is bound to the AV by carrying the RAT in a certain Diameter AVP, the Diameter AVP is sent to the AAA server.

It is obvious that, the process of binding the RAT of the WLAN network to the AV and the binding process in Embodiment 1 can employ the same method.

In the above two embodiments, the RAT is not limited to being categorized into specific types such as Wimax, CDMA2000, and WLAN; instead, the RAT may also be categorized into only two types, namely, trusted non-3GPP access networks and untrusted non-3GPP access networks.

In addition, the solutions in Embodiment 1 and Embodiment 2 can also be extended to not only carry information of the RAT, but also include information of a Mobile Network Code (MNC) and a Mobile Country Code (MCC). In this way, more information is bound, and thus higher security is achieved. The AV, MNC+MCC, and the RAT are bound, so that when an entity in the non-3GPP access network where the user resides is breached, or an ePDG connected to the untrusted non-3GPP access network is breached, the stolen AV can neither be applied to other non-3GPP access networks by the attacker nor applied to non-3GPP access networks of the same type as long as the MCCs or MNCs are different, thereby enhancing the security.

Embodiment 3 of the present invention is provided as follows, to illustrate the binding mode with higher security. For ease of description, the applicant introduces the name of access network information. In Embodiment 1 and Embodiment 2, access network information refers to the RAT, and in Embodiment 3, access network information refers to a combination of MNC+MCC and an RAT, in which MNC+MCC is referred to as a network identity. In a word, any parameter or combination of parameters for binding an AV to realize the objective of the present invention can be referred to as access network information.

Figure 2:
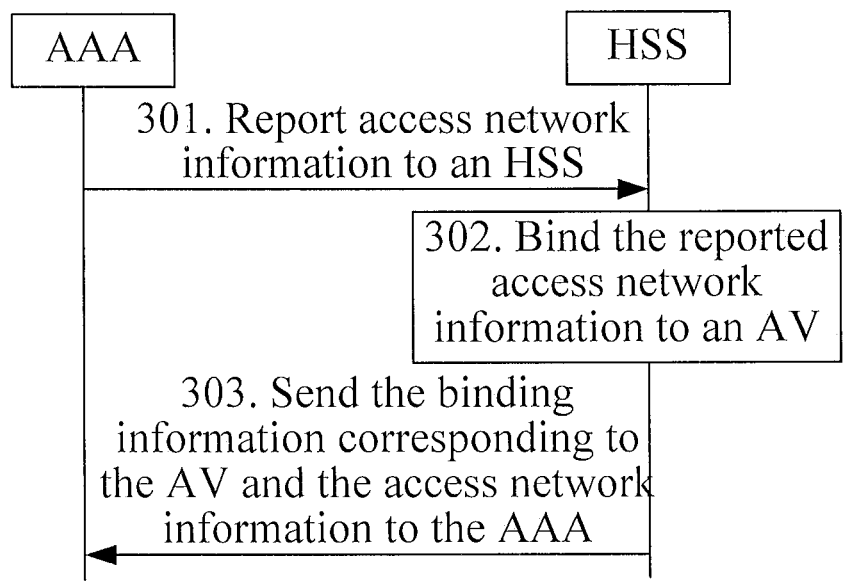
FIG. 2 is a flow chart illustrating a process of binding access network information to an AV in Embodiment 3 of the present invention.

In Embodiment 3, access network information refers to a combination of MNC+MCC and an RAT. As shown in FIG. 2, the method includes the following steps:

In step 301, after accessing an EPS through a non-3GPP access network, the user is connected to an AAA server through an interface between the non-3GPP access network and the AAA server. The AAA server reports access network information of the non-3GPP access network accessed by the user to an HSS. In this embodiment, the access network information indicates that the accessed non-3GPP access network is a Wimax/CDMA2000/WLAN/trusted non-3GPP access network/untrusted non-3GPP access network, and the network identity is MNC+MCC, where "/" represents the relationship of OR.

In this embodiment, the AAA can carry the access network information in a certain Diameter AVP. The specific method is as described in the example in Embodiment 1.

In step 302, after receiving an authentication request of the AAA server, the HSS binds the access network information reported by the AAA server to an AV of the user, and generates binding information corresponding to the AV and the access network information.

In this embodiment, the access network information reported by the AAA server can be bound to the AV by calculating a key, and the generated binding information is the calculated key. For example, the HSS calculates a key according to the formula: Key=K (CK, IK, MNC+MCC, Wimax/CDMA2000/WLAN/trusted non-3GPP access networks/untrusted non-3GPP access networks), where CK and IK are two parameters in the AV, MNC+MCC is a network identity of the non-3GPP network where the user resides, a combination of MNC+MCC and an RAT is the access network information reported by the AAA server; and K( ) is an algorithm for calculating the key. The HSS can bind the access network information to the AV by using this method, and the calculated Key is the generated binding information.

In this embodiment, the HSS can also carry the access network information in [SIP-Authentication-Scheme] or [Authentication Method] in a Diameter AVP: [SIP-Auth-Data-Item] and bind the RAT to the AV. The Diameter AVP generated in this way is the binding information. Definitely, the Diameter AVP carrying the access network information is not limited to that described above, and any Diameter AVP that can implement the binding between the access network information and the AV can be applied.

In step 303, the HSS sends the binding information corresponding to the AV and the access network information to the AAA server. If the access network information is bound to the AV by calculating a key, the key is sent to the AAA server; if the access network information is bound to the AV by carrying the access network information in a certain Diameter AVP, the Diameter AVP is sent to the AAA server.

The binding method in Embodiment 3 can achieve higher security than that of Embodiment 1 and Embodiment 2. That is, when AV information of the user is stolen, the stolen AV can neither be applied to other non-3GPP access networks by the attacker nor applied to non-3GPP access networks of the same type as long as the MCCs or MNCs are different.

A system for preventing abuse of an AV is provided in Embodiment 4 of the present invention. The system includes an AAA server and an HSS.

The AAA server is configured to send access network information of a non-3GPP access network where a user resides to the HSS, and receive binding information corresponding to an AV and the access network information, wherein the binding information is sent by the HSS.

The HSS is configured to receive the access network information of the non-3GPP access network where the user resides, wherein the information is sent by the AAA server, generate the binding information corresponding to the AV of the user and the access network information, and send the binding information to the AAA server.

The access network information in the system can be an RAT or a combination of an RAT and MNC+MCC. The RAT can be categorized into a Wimax network, a CDMA2000 network, or a WLAN network, or categorized into a trusted non-3GPP access network and an untrusted non-3GPP access network. The access network information can be represented by letters or numbers.

In the system, the AAA server can carry the access network information of the non-3GPP access network where the user resides in the AVP and send the information to the HSS. For example, the AAA server can carry the access network information in a Diameter AVP: [visited-network-identifier] and send the information to the HSS, or carry the access network information in a Diameter AVP: [NAS-Port-Type].

In the system, the HSS can generate the binding information corresponding to the AV and the access network information by calculating a key. The HSS can also generate an AVP carrying the access network information as the binding information corresponding to the AV and the access network information, for example, carry the access network information in [SIP-Authentication-Scheme] or [Authentication Method] in a Diameter AVP: [SIP-Auth-Data-Item] and bind the access network information to the AV.

Figure 3:
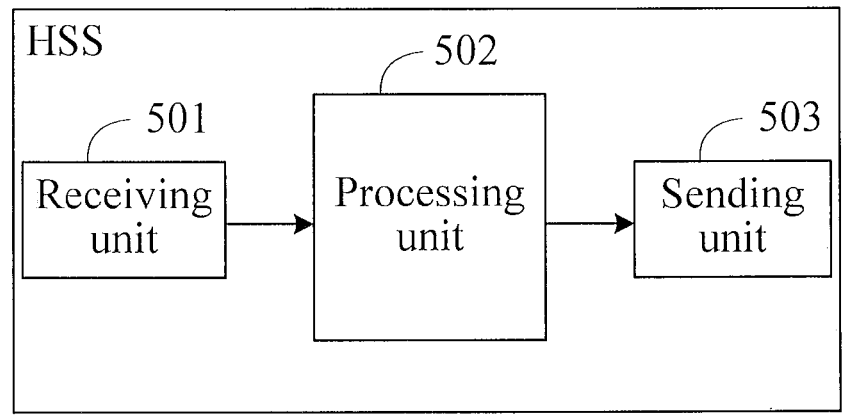
FIG. 3 is a structural view of an HSS in Embodiment 5 of the present invention.

An HSS is provided in Embodiment 5 of the present invention. As shown in FIG. 3, the HSS includes a receiving unit 501, a processing unit 502, and a sending unit 503.

The receiving unit 501 is configured to receive access network information of a non-3GPP access network where a user resides, wherein the information is sent by the AAA server, and provide the access network information to the processing unit 502.

The processing unit 502 is configured to generate binding information corresponding to an AV of the user and the access network information, and provide the binding information to the sending unit 503.

The sending unit 503 is configured to send the binding information provided by the processing unit 502 to the AAA server.

Figure 4:
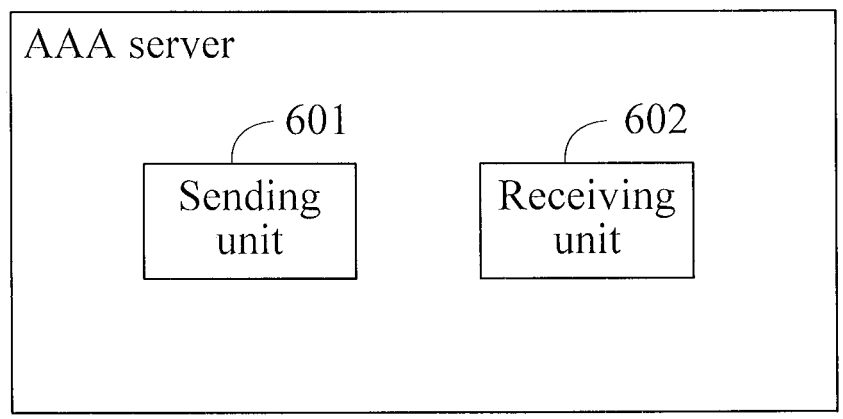
FIG. 4 is a structural view of an AAA server in Embodiment 6 of the present invention.

An AAA server is provided in Embodiment 6 of the present invention. As shown in FIG. 4, the AAA server includes a sending unit 601 and a receiving unit 602.

The sending unit 601 is configured to send access network information of a non-3GPP access network where a user resides to an HSS.

The receiving unit 602 is configured to receive binding information corresponding to an AV and the access network information, wherein the binding information is sent by the HSS.

Through the descriptions of the above embodiments, persons skilled in the art may understand that the present invention can be implemented by software plus a necessary universal hardware platform or by hardware. However, in most cases, using software plus a necessary universal hardware platform is preferred. Based on such understandings, the technical solution of the present invention or the part that makes contributions to the prior art can be substantially embodied in the form of a software product. The software product is stored in a storage medium, and includes several instructions that enable a network device to perform the methods described in the embodiments of the present invention.

The above descriptions are merely preferred embodiments of the present invention, but not intended to limit the scope of the present invention. Any modifications or variations that can be derived by those skilled in the art should fall within the scope of the present invention.

What is claimed is:

1. A method for preventing abuse of an Authentication Vector (AV) when a user accesses an Evolved Packet System (EPS) through a non-3rd Generation Partnership Project (non-3GPP) access network, the method comprising:
   receiving access network information of the non-3GPP access network where the user resides, wherein the access network information is sent by an Authorization, Authentication and Accounting Server (AAA server) of the EPS;
   calculating a key for binding the access network information to the AV of the user according to a formula: Key =K(CK, IK, access network information), wherein CK and IK are two parameters in the AV of the user and K( ) is an algorithm for calculating the key; and
   sending the key to the AAA server.

2. The method according to claim 1, wherein the access network information comprises a Radio Access Technology (RAT) or a combination of an RAT and a network identity of the non-3GPP network.

3. The method according to claim 2, wherein the RAT indicates that the non-3GPP access network is a Worldwide Interoperability for Microwave Access (Wimax) network, a Code Division Multiple Access (CDMA) 2000 network, a Wireless Local Area Network (WLAN) network, a trusted non-3GPP access network, or an untrusted non-3GPP access network; and the network identity of the non-3GPP access network comprises a Mobile Network Code (MNC) and a Mobile Country Code (MCC).

4. The method according to claim 1, wherein the access network information is carried in an Attribute Value Pair (AVP), wherein the access network information is sent by the AAA server.

5. A Home Subscriber Server (HSS), comprising:
   a receiver, configured to receive access network information of a non-3rd Generation Partnership Project (non-3GPP) access network where a user resides, wherein the access network information is sent by an Authorization, Authentication and Accounting Server (AAA server), and provide the access network information to a processor;
   the processor, configured to calculate a key for binding the access network information to an Authentication Vector (AV) of the user according to a formula: Key =K(CK, IK, access network information), wherein CK and IK are two parameters in the AV of the user and K( )is an algorithm for calculating the key; and
   the transmitter, configured to send the key provided by the processor to the AAA server.

6. An Authorization, Authentication and Accounting Server (AAA server), comprising:
   a transmitter, configured to send access network information of a non-3rd Generation Partnership Project (3GPP) access network where a user resides to a Home Subscriber Server (HSS); and
   a receiver, configured to receive a key for binding the access network information to an Authentication Vector (AV) of the user, the key calculated according to a formula: Key =K(CK, IK, access network information), wherein CK and IK are two parameters in the AV of the user and K( ) is an algorithm for calculating the key.

7. A system for preventing abuse of an Authentication Vector (AV), the system comprising an Authorization, Authentication and Accounting Server (AAA server) and a Home Subscriber Server (HSS), wherein
   the AAA server is configured to send access network information of a non-3rd Generation Partnership Project (3GPP) access network where a user resides to the HSS, and receive a key from the HSS; and
   the HSS is configured to receive the access network information of the non-3GPP access network where the user resides, calculate the key for binding the access network information to the AV of the user according to a formula: Key =K(CK, IK, access network information), wherein CK and IK are two parameters in the AV of the user and K( ) is an algorithm for calculating the key, and send the key to the AAA server.

8. The system according to claim 7, wherein the access network information comprises a Radio Access Technology (RAT) or a combination of an RAT and a network identity of the non-3GPP access network.

* * * * *

UNITED STATES PATENT AND TRADEMARK OFFICE
CERTIFICATE OF CORRECTION

| | | |
|---|---|---|
| PATENT NO. | : 8,600,054 B2 | Page 1 of 1 |
| APPLICATION NO. | : 12/892757 | |
| DATED | : December 3, 2013 | |
| INVENTOR(S) | : Yanmei Yang, Yixian Xu and Jing Chen | |

It is certified that error appears in the above-identified patent and that said Letters Patent is hereby corrected as shown below:

In the claims,

Column 8, Claim 5, line 15, delete "the" (first occurrence) and insert -- a --.

Signed and Sealed this
Ninth Day of February, 2016

Michelle K. Lee
*Director of the United States Patent and Trademark Office*